Patented Aug. 4, 1953

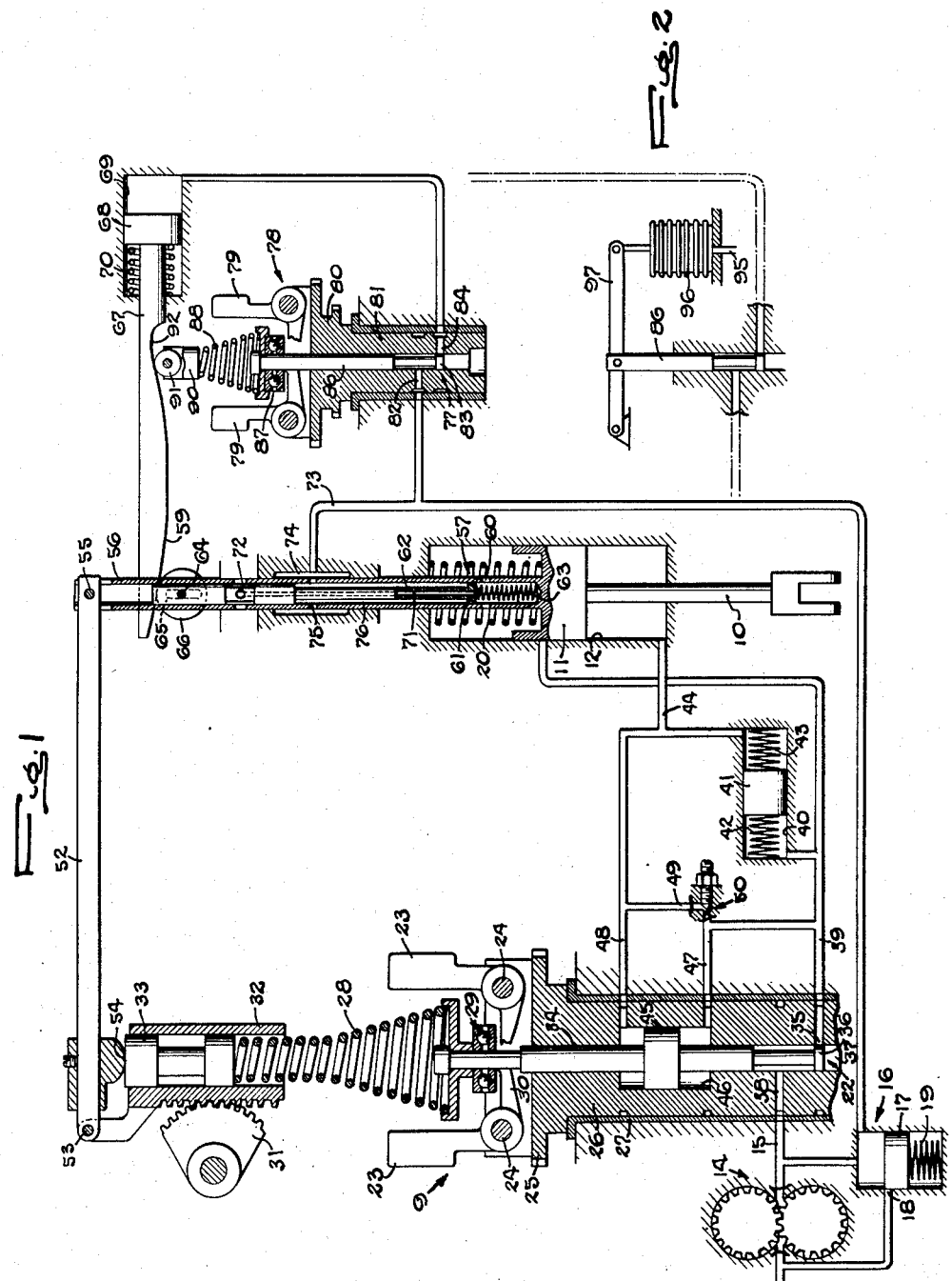

2,647,493

UNITED STATES PATENT OFFICE 2,647,493

FLUID ACTUATED GOVERNOR CONTROL

Willard J. Whitehead and George E. Parker, Rockford, Ill., assignors to Woodward Governor Company, Rockford, Ill., a corporation of Illinois Application April 24, 1952, Serial No. 284,022

4 Claims. (Cl. 121—42)

This invention relates to an automatic control for prime movers of the type shown in the Patent 2,364,115 in which the energization of a fluid pressure actuated servo of the so-called compensated or isochronous type is normally controlled by a speed senser and modified in its action in response to an abnormal condition evidenced by movement of a stop into the path of a part movable with the servo actuated element.

One object is to improve upon the patented apparatus through the provision of a modifying control of a character such that fluid leakage does not affect the operation of the compensating system of the governor.

A more detailed object is to modify the action of the main servo by admitting pressure fluid to the side of the servo piston in opposition to the fluid pressure controlled by the primary condition responsive device.

Other objects and advantages of the invention will become apparent from the following detailed description taken in connection with the accompanying drawing in which Figure 1 is a schematic view and hydraulic circuit diagram of a speed governor embodying the novel features of the present invention.

Fig. 2 is a fragmentary schematic view showing a modified form of the secondary control mechanism.

In the drawing, the invention shown is incorporated in a hydraulic governor 9 operable automatically in response to changes in the speed of a prime mover (not shown) to adjust a rod 10 adapted to be connected to a valve or other device for controlling the supply of an energy medium to the prime mover. The fluid servo of the governor includes a piston 11 on the rod 10 slidable in a cylinder 12 in the governor casing which houses a pump 14 driven by the prime mover and delivering fluid under pressure to a supply passage 15. The latter communicates with an accumulator 16 having a valve member 17 cooperating with a by-pass outlet 18 and loaded by a spring 19 to maintain the desired supply pressure.

The piston 11 is biased in the fuel decreasing direction as by a coil compression spring 20 and is moved in the opposite direction by the admission of pressure fluid from the passage 15 to the lower end of the cylinder 12 through a valve 22 actuated by the governor speed senser. The latter comprises a pair of flyweights 23 pivoted at 24 on a head 25 driven through suitable mechanism in unison with the prime mover and fast on the upper end of a ported sleeve 26 rotatable in a bushing 27 in the governor casing. The centrifugal force acting on the flyweights is balanced against the force compression spring 28 bearing downwardly against the upper race of a ball thrust bearing 20 whose outer race is engaged by arms 30 on the flyweights. The spring force, which determines the engine speed maintained by the governor, may be adjusted manually by turning a segment 31 geared to a sleeve 32 supporting an abutment 33 which bears against the upper end of the spring.

The control force derived from changes in the flyweight speed is applied to the plunger 34 of the valve 22 which is formed by a port 35 coacting with a land 36 on the plunger. The latter is slidable in a bore of the sleeve 26 and is connected at its upper end to the upper race of the bearing 29. Below the land 36, the sleeve communicates with a drain passage 37. Through a groove in the bushing 27 and a hole 38 in the sleeve 26, the fluid supply passage 15 communicates continuously with the space above the valve land 36. The outlet port 35 is connected to a space 39 communicating with one end of a cylinder 40 having a piston 41 slidable therein and urged toward a centered position by compression springs 42 and 43. The other end of the cylinder communicates through a passage 44 with the rod end of the servo cylinder 12 so that pressure fluctuations in the space 39 to which fluid is delivered or from which it is released when the valve land 36 is below and above the port 35 are communicated to the servo piston 11 through the intermediary of the piston 41.

The so-called compensating system for producing isochronous operation of the governor 9 includes a wall or piston 45 fast on the valve stem 34 and reciprocable in a cylinder 46 formed in the sleeve 26 and connected at its lower end to a passage 47 leading to the valve controlled space 39. A passage 48 extends from the upper end of the cylinder 46 to the passage 44 and therefore the servo cylinder 12. A by-passage 49 having an adjustable needle valve 50 therein permits slow leakage of fluid between the passages 47 and 48.

In operation, when the land 36, in response to a speed decrease below the prevailing speed setting of the governor, is lowered from the neutral position shown, pressure fluid will flow into the passage 39 and the resulting pressure increase moves the piston 41 to the right compressing the spring 43 and forcing fluid out of the remote end of the cylinder 40 into the servo cylinder 12. The servo piston is thus moved upwardly in the speed increasing direction against the normal biasing force. Conversely, a detected rise in speed causes the valve land to be raised above the port 35 allowing fluid to escape to the sump thus decreasing the pressure in the passage 39. This allows the piston 41 to move under the higher pressure existing in the servo cylinder 12 thereby compressing the spring 42 and allowing the servo piston to move downwardly in the speed decreasing direction.

In response to either of the correcting actions above described a pressure difference develops between the valve control passage 39 and the servo passage 44, the differentials being in opposite senses depending on whether the speed rises above or falls below the governor setting. The compensating system above described utilizes these pressure differentials to derive a force acting on the compensating piston 45 in a direction to restore the valve stem to its neutral position. This drooping characteristic is then dissipated gradually through the restriction 59 until normal speed has been restored under the changed load as is set forth more fully in the aforementioned patent. The action results in the fuel valve or other device actuated by the rod 19 taking a new position without a permanent change in the engine speed.

If desired, permanent speed droop may be provided for by adjustment of the speeder spring stress independently of the segment 31 and in accordance with the normal movements of the servo piston 11. This may be accomplished through a lever 52 fulcrumed at 53 on the sleeve 32 and bearing downwardly at 54 on the plug 33 which is slidable in the sleeve. The free end of the lever is pivotally connected at 55 to the upper end of a rod 56 rigid with and projecting upwardly from the servo piston 11. For any given setting of the segment 31, the position of the fulcrum 53 is fixed so that as the servo piston moves in response to a speed change, the rod 56 moves the lever 52 about the fulcrum imparting a corresponding movement to the plug 33 to change the loading of the speeder spring 28 and produces permanent speed droop.

In accordance with the present invention, which is particularly adapted for use with a control of the above character, provision is made for limiting the speed-increasing movement of the servo upon the occurrence of an abnormal operating condition by admitting pressure fluid to the upper end of the servo piston 11 from a source movable with the piston so as to derive a secondary force supplementing the normal biasing force and overcoming the opposing pressure on the opposite side of the piston thereby preventing advance of the piston under the control of the governor 9 beyond a predetermined safe limit position. For this purpose, a valve 57 is mounted on the servo piston to move therewith and remain closed until, in its speed increasing movement, a member of the valve which is movable relative to the servo piston encounters a retractible stop 59 rendered active and inactive in response to changes in a secondary condition such for example as a reduction in the prime mover speed to a predetermined value.

To form the valve 57, the upstanding piston rod 56 is a tube having a hole 60 therein within the upper end of the servo cylinder 12 and cooperating with a land 61 on the lower end of a plunger 62 which is slidable in the tube and urged upwardly by a compression spring 63 seated in the lower end of the tube. A cross pin 64 rigid with the upper end of the plunger 62 slides in a longitudinal slot 65 in the tube and carries a roller 66 which is held by action of the spring 63 in contact with an inclined cam surface forming the stop 59. The cam surface extends along the projecting end of a rod 67 of a piston 68 slidable in a cylinder 69 and urged by a compression spring 70 in a direction to retract the stop.

When the valve land 61 is disposed in normal position above the port 60 as shown in Fig. 1, the upper end of the servo cylinder 12 is drained through the hole 60 and a passage 71 extending upwardly through the plunger 62 and then laterally through a hole 72 in the tube 56. Through a conduit 73, a groove 74 surrounding the tube, and a hole 75 in the tube, the interior 76 of the latter above the land 61 is connected continuously to the pressure supply passage 15 thereby forming a source of pressure fluid that moves with the piston 11. Thus when the land is lowered below the port 60, fluid from the secondary pressure source is admitted to the upper end of the cylinder 12. The force thus exerted on the upper end of the piston 11 combined with the biasing force of the spring 28 is sufficient to overcome the pressure controlled by the governor 9 and applied to the lower end of the piston so that the latter is moved downwardly until the port 60 becomes covered by the land 61.

Such lowering of the land 61 below the valve port 60 occurs during the upward movement of the servo piston when the stop 59 has been advanced to present a high point on the cam surface to the roller 66. With the position of the valve land 61 thus fixed, further upward or fuel increasing movement of the piston will raise the port 60 which admits fluid from the pressure source to the upper end of the servo cylinder as soon as it passes above the land 61. The upward movement of the piston 11 is thus interrupted even though the governor 9, owing to a detected fall in speed below the prevailing speed setting, is calling for more fuel.

Over-riding of the action of the governor 9 in this manner may be produced upon the occurrence of various abnormal operating conditions. If the abnormal condition is a predetermined reduction in the speed of the prime mover controlled by the governor 9, the servo 68, 69 for advancing and retracting the stop 59 may be variably energized by operation of a valve 77 by a speed sensor 78. As shown, the latter comprises flyweights 79 pivoted on a head 80 driven by suitable mechanism (not shown) from the prime mover.

The head 80 is on the upper end of a hollow sleeve 81 journaled in the governor casing and having a port 82 therethrough connected to the fluid pressure supply passage. The valve 77 comprises a land 83 cooperating with a port 84 connected through a passage 85 to the cylinder 69. The land is on the lower end of a plunger 86 slidable in the sleeve 81 and connected to one race of a thrust bearing 87 urged downwardly by a compression spring 88 and upwardly by the flyweight force applied through arms 89. To impart a drooping characteristic of substantial magnitude to the auxiliary speed sensor 78, a speeder spring 88 is loaded variably in accordance with changes in the position of the piston 68. For this purpose, the upper end of the spring bears against a plug 90 slidable in the governor casing and carrying a roller 91 which rides along an inclined cam surface 92 cut from the lower edge of the stop rod 67.

Under normal operating conditions, the parts will be positioned as shown in Fig. 1 and the governor 9 will be in full control of the servo 11, 12 since the stop 59 is retracted to a position at which the land 61 is disposed above the port 60. Now if the engine speed decreases, the force of the spring 88 will move the flyweights 79 inwardly lowering the land 83 below the port 84 to admit pressure fluid to the cylinder 69 thus causing the piston 68 and the stop 67 to be advanced to the left. The main valve land 61 is thus cammed downwardly as the main governor 9 responds to the speed decrease thus increasing the energization of the main servo thereby raising the port 60. If the overloading of the prime mover continues, the land 61 will pass below the port 60 whereupon fluid at high pressure is admitted through the valve 57 to the upper end of the servo piston 11 thus assisting the spring 20 in overcoming the upwardly acting pressure on the lower end of the piston. The upward or fuel increasing movement of the latter is thus interrupted even though the main governor may be attempting to increase the fuel supply.

The stop 59 may be rendered active in response to various other conditions, for example variations in pressure in a passage 95 (Fig. 2). Such pressure changes may be communicated to a bellows 96 acting through a lever 97 to actuate the valve plunger 86 and thus vary the energization of the servo 68, 69 in the manner previously described.

We claim as our invention:

1. Mechanism of the character described having, in combination, a cylinder, a piston reciprocable therein, means normally biasing said piston in one direction, speed responsive means including a fluid control valve regulating the admission of pressure fluid to one end of said piston to move the latter in the opposite direction against said biasing means, a hollow tube projecting axially from the other side of said piston and movable therewith, said tube having a port therein, a source of fluid under pressure, means defining a passage providing continuous communication between said source and the interior of said tube outwardly beyond said port, a plunger slidable in said tube and cooperating with said port to form a valve, means normally biasing said valve in a direction to block the escape of said fluid outwardly through said port, a stop movable into and out of an active position in the path of said plunger and adapted when in such position to hold the plunger in a position to uncover said port when said piston moves beyond a predetermined position under the control of said speed responsive means, and means for moving said stop into and out of said active position in response to variations in a secondary condition.

2. Mechanism of the character described having, in combination, a cylinder, a piston reciprocable therein, means normally biasing said piston in one direction, speed responsive means including a fluid control valve regulating the admission of pressure fluid to one end of said piston to move the latter in the opposite direction against said biasing means, a rod carried by and movable with said piston and movable axially relative to the piston, a stop movable transversely of the path of said rod and adapted when in a predetermined position to block the rod and prevent further movement thereof in the continued movement of the piston, a source of fluid under pressure, and means for establishing communication between said source and the other side of said piston whereby to supplement the force of said biasing means and move the piston in the direction of the bias, said last mentioned means including a normally closed valve mounted on and movable with said piston and rod and adapted to be opened in the movement of said piston following engagement of said rod and stop in said predetermined position.

3. Mechanism of the character described having, in combination, means providing a source of fluid under pressure, a cylinder, a piston reciprocable therein, means normally biasing said piston in one direction, a primary condition responsive means including a fluid control valve regulating the admission of pressure fluid from said source to one end of said piston to move the latter in the opposite direction against said biasing means, means enclosing a space on the opposite end of said piston, means for establishing communication between said source and said space including a normally closed valve movable with said piston and having a member movable relative to the piston, a stop movable into and out of an active position blocking further movement of said valve member whereby to cause opening of the valve in the further movement of said piston against the force of said biasing, and means responsive to a secondary control condition for variably positioning said stop.

4. Mechanism of the character described having, in combination, a cylinder, a piston reciprocable therein and normally biased in one direction, a primary condition responsive means, means including a valve actuated by said last mentioned means for admitting fluid under pressure to and releasing the fluid from one end of said cylinder to variably position said piston against the action of the normal bias thereon, means providing a source of fluid under pressure movable with said piston, a stop movable into and out of an active blocking position, means responsive to changes in a secondary condition for moving said stop into and out of said position, a normally closed valve movable with said piston and adapted when opened to admit pressure fluid from said movable source to the other end of said piston and thereby prevent further movement thereof, and a member movable with and relative to said piston and adapted when blocked by said stop in active position to open said second valve when the piston reaches a predetermined position under the control of said primary means.

WILLARD J. WHITEHEAD.
GEORGE E. PARKER.

No references cited.